US011363558B2

(12) United States Patent
Silverman et al.

(10) Patent No.: US 11,363,558 B2
(45) Date of Patent: Jun. 14, 2022

(54) ACCESS POINT (AP) PLACEMENT USING FINE TIME MEASUREMENT (FTM)

(71) Applicant: Cisco Technology, Inc., San Jose, CA (US)

(72) Inventors: Matthew Aaron Silverman, Shaker Heights, OH (US); Xu Zhang, Fremont, CA (US); Santosh Ghanshyam Pandey, Fremont, CA (US); Jerome Henry, Pittsboro, NC (US); Paul J. Stager, Akron, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 293 days.

(21) Appl. No.: 16/655,030

(22) Filed: Oct. 16, 2019

(65) Prior Publication Data

US 2021/0120515 A1 Apr. 22, 2021

(51) Int. Cl.
*H04W 64/00* (2009.01)
*H04W 16/28* (2009.01)
*G01S 13/76* (2006.01)

(52) U.S. Cl.
CPC ......... *H04W 64/003* (2013.01); *G01S 13/762* (2013.01); *H04W 16/28* (2013.01)

(58) Field of Classification Search
CPC ...... G01S 11/02; G01S 13/762; G01S 13/765; H04B 7/0617; H04W 16/28; H04W 64/003

USPC ....................................................... 370/252
See application file for complete search history.

(56) References Cited

U.S. PATENT DOCUMENTS

| 2017/0222704 | A1 | 8/2017 | Eitan et al. |
| 2018/0295601 | A1 | 10/2018 | Wang et al. |
| 2019/0129024 | A1 | 5/2019 | Kasher et al. |
| 2019/0141556 | A1 | 5/2019 | Kasher et al. |

FOREIGN PATENT DOCUMENTS

| WO | 2018046271 A1 | 3/2018 | |
| WO | WO-2018046271 A | * 3/2018 | .......... H04W 72/048 |

OTHER PUBLICATIONS

Jens Schroeder et al, "NLOS detection, algorithms for Ultra-Wideband Localization" Positioning, Navigation and Communication, (Year: 2007).*

(Continued)

*Primary Examiner* — Gbemileke J Onamuti
(74) *Attorney, Agent, or Firm* — Merchant & Gould P.C.

(57) ABSTRACT

Access Point (AP) placement using Fine Time Measurement (FTM) may be provided. First, a plurality of Time-of-Flight (ToF) values between a first service end point and a second service end point may be determined. Each one of the plurality of ToF values may be derived from packets transmitted via different beamforming vector patterns at the first service end point and the second service end point. Then a minimum ToF value of the plurality of ToF values may be determined. Next, a distance between the first service end point and the second service end point may be determined based on the minimum ToF value.

20 Claims, 8 Drawing Sheets

(56) References Cited

OTHER PUBLICATIONS

Schroeder, Jens et al. "NLOS detection algorithms for Ulta-Wideband localization", Positioning, Navigation and Communication, 2007. WPNC '07. 4th Wo Rkshop on, IEEE, PI, Mar. 1, 2007 (Mar. 1, 2007), pp. 159-166, XP031080632, ISBN: 978-1-4244-0870-2 Section I I I.A (14 pgs.).
International Search Report and Written Opinion issued in PCT/US2020/054991, dated Dec. 16, 2020, 13 pages.
Ibrahim, Mohamed, Hansi Liu, Minitha Jawahar, Viet Nguyen, Marco Gruteser, Richard Howard, Bo Yu, Fan Bai. 2018. "Verification: Accuracy Evaluation of WiFi Fine Time Measurements on an Open Platform". In Proc. of the 24th Annual International Conference on Mobile Computing and Networking (MobiCom'18), Oct. 29-Nov. 2, 2018, New Delhi, India. ACM, New York, NY, USA. 11 pages. DOI: https://doi.org/10.1145/3241539.3241555.

\* cited by examiner

US 11,363,558 B2

ACCESS POINT (AP) PLACEMENT USING FINE TIME MEASUREMENT (FTM)

TECHNICAL FIELD

The present disclosure relates generally to wireless access points.

BACKGROUND

In computer networking, a wireless Access Point (AP) is a networking hardware device that allows a wireless compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where wireless access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
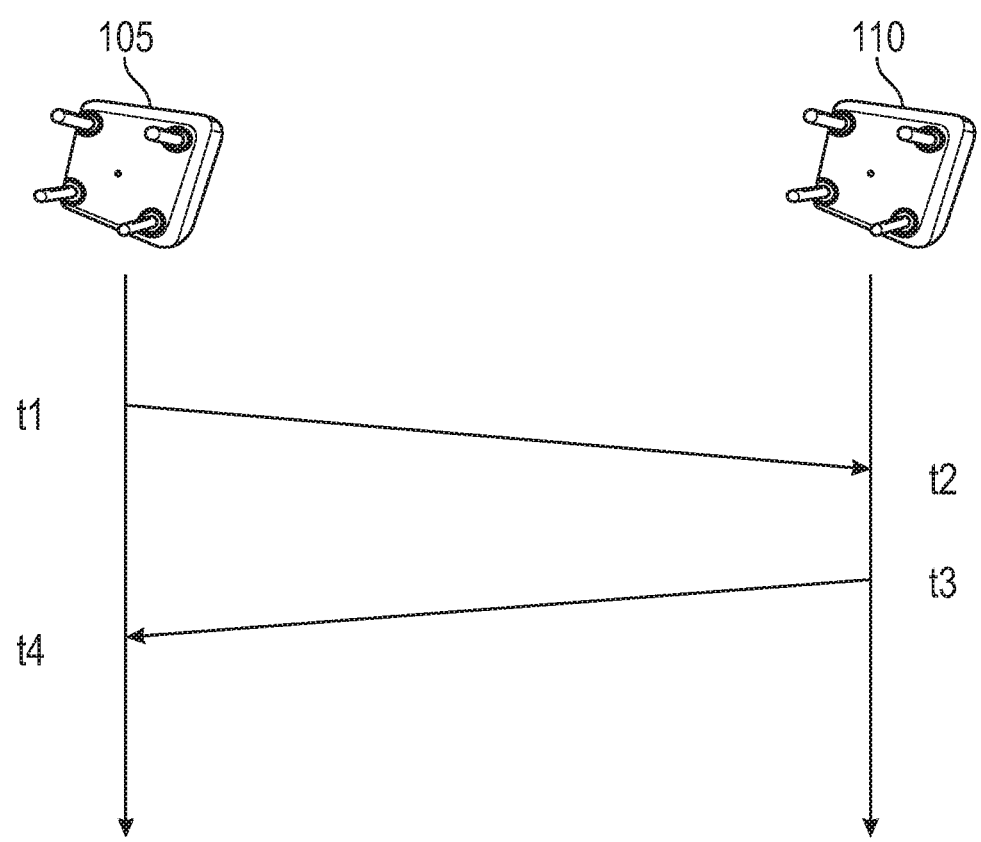
FIG. 1 illustrates Access Point (AP)-to-AP Time-of-Flight (ToF) ranging.

Access Point (AP) placement using Fine Time Measurement (FTM) may be provided. First, a plurality of Time-of-Flight (ToF) values between a first service end point and a second service end point may be determined. Each one of the plurality of ToF values may be derived from packets transmitted via different beamforming vector patterns at the first service end point and the second service end point. Then a minimum ToF value of the plurality of ToF values may be determined. Next, a distance between the first service end point and the second service end point may be determined based on the minimum ToF value.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

For both network deployment and network analytics, it may be important to determine accurate locations of service end points (e.g., Access Points (APs)) in a network. In conventional system, the locations of service end points may be determined and manually entered. This manual process may be tedious (especially at scale) and error-prone. Embodiments of the disclosure may automate determining service end point location and placement so it may become nearly a zero touch process. While Wi-Fi6 may take advantage of Institute of Electrical and Electronic Engineers (IEEE) 802.11az/mc (i.e., Fine Timing Measurement (FTM)) to make accurate estimates, this may only work well when service end points are in a Line-of-Sight (LOS) environment. IEEE 802.11az includes provisions to perform ranging using Wi-Fi6 modulations and grouping (i.e., more than one station ranges at a given time, using multi user grouping in IEEE 802.11ax).

Analytics engines may be used to monitor and control wireless networks including, for example, providing processes for auto-placement of APs instead of requiring manual placement. These process may require accurate inter-AP ranging. Processes using Received Signal Strength Indicator (RSSI) may not provide an accurate result for inter-AP ranging, however, Time-of-Flight (ToF) ranging (i.e., using Fine Time Measurement (FTM)) may provide better accuracy. ToF was enabled by IEEE 802.11mc, but later refined for better security and scale with IEEE 802.11az. IEEE 802.11az may enable better scaling of inter-device ranging by allowing for more ranging to occur at one time, but it fails to address poor performance in Non-Line-of-Sight (NLOS) environments. Embodiments of the disclosure may addresses this poor performance in NLOS environments.

FIG. 1 shows an operating environment 100. As shown in FIG. 1, operating environment 100 may comprise a first service end point 105 and a second service end point 110. First service end point 105 may comprise a first wireless Access Point (AP) and second service end point 110 may comprise a second wireless AP. First service end point 105 and second service end point 110 may provide network access using Wi-Fi technology, via a Wireless Local Area Network (WLAN) using a router connected to a service provider. For example, first service end point 105 and second service end point 110 may operate using the IEEE 802.11 standard.

Client devices may associate with first service end point 105 and second service end point 110. These client devices may comprise, but not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device.

The elements described above of operating environment 100 (e.g., first service end point 105 and second service end point 110) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 7, the elements of operating environment 100 may be practiced in a computing device 700.

FIG. 1 illustrates ToF ranging between first service end point 105 and second service end point 110. ToF ranging measures a signal propagation delay from one device (e.g., first service end point 105) to another (e.g., second service end point 110). By multiplying the signal propagation delay with the speed of light, inter-AP distance for ranging and location determination may be obtained. ToF may require high accuracy, for example, at the nanosecond (ns) level. For example, 3 ns may translate to around 1 meter (m). In comparison, a Wi-Fi Media Access Control (MAC) clock may only have microsecond accuracy.

As shown in FIG. 1, first service end point 105 may time stamp a packet with time t1 and send the packet at t1. Second service end point 110 may receive the packet at time t2 and time stamp it with t2. Second service end point 110 may time stamp the packet with time t3 and send the packet at time t3. First service end point 105 may receive the packet at time t4 and time stamp it with t4. A ToF value (e.g., a signal propagation delay) between first service end point 105 and second service end point 110 may be determined. IEEE 802.11mc/az specifies using a packet exchange to compute ToF value=[(t4−t1)−(t3−t2)]/2. This exchange may be repeated one or more times and an average value for the exchanges may be used. The ToF value may be multiplied by the speed of light to obtain the distance between first service end point 105 and second service end point 110.

Obtaining t1 and t3 may be relatively easy because first service end point 105 and second service end point 110 may respectively know when the packet is transmitted. However, t2 and t4 may sometimes be difficult to obtain because multiple copies of the packet may be received with different delays and strengths due to signal reflections that cause a multipath environment. Accordingly, for accurate values of t2 and t4 values, the first copy of the packet may need to be identified and selected, otherwise the total error of ToF may be [delta(t2)+delta(t4)]/2. Furthermore, if the multipath (i.e., NLOS) is strong relative to the LOS path, the multipath may dominate the ToF estimate for t2 and t4. In other words, using the above described ToF exchange, it may be determined how far apart first service end point 105 and second service end point 110 are. However, this may work best if first service end point 105 and second service end point 110 have a good LOS.

Figure 2A:
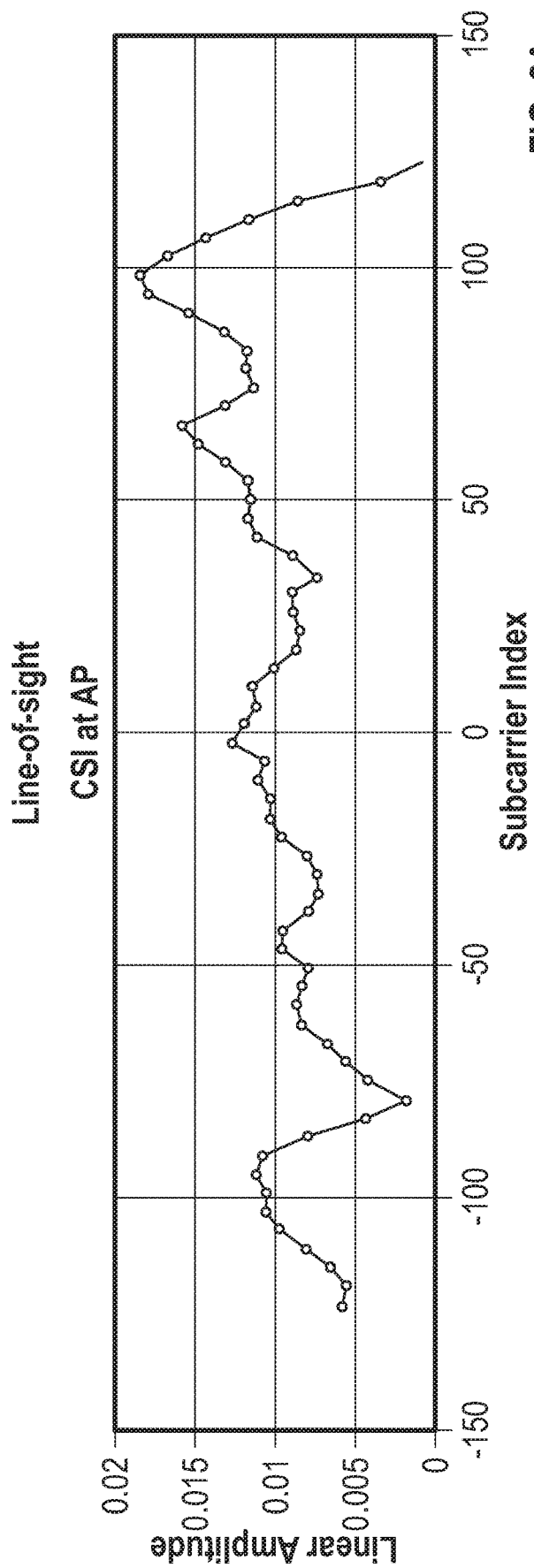
FIG. 2A, FIG. 2B, FIG. 2C, and FIG. 2D illustrate signal Channel State Information (CSI) in the frequency domain and in the time domain for Line-of-Sight (LOS) and Non-line-of-Sight (NLOS) environments.
Figure 2B:
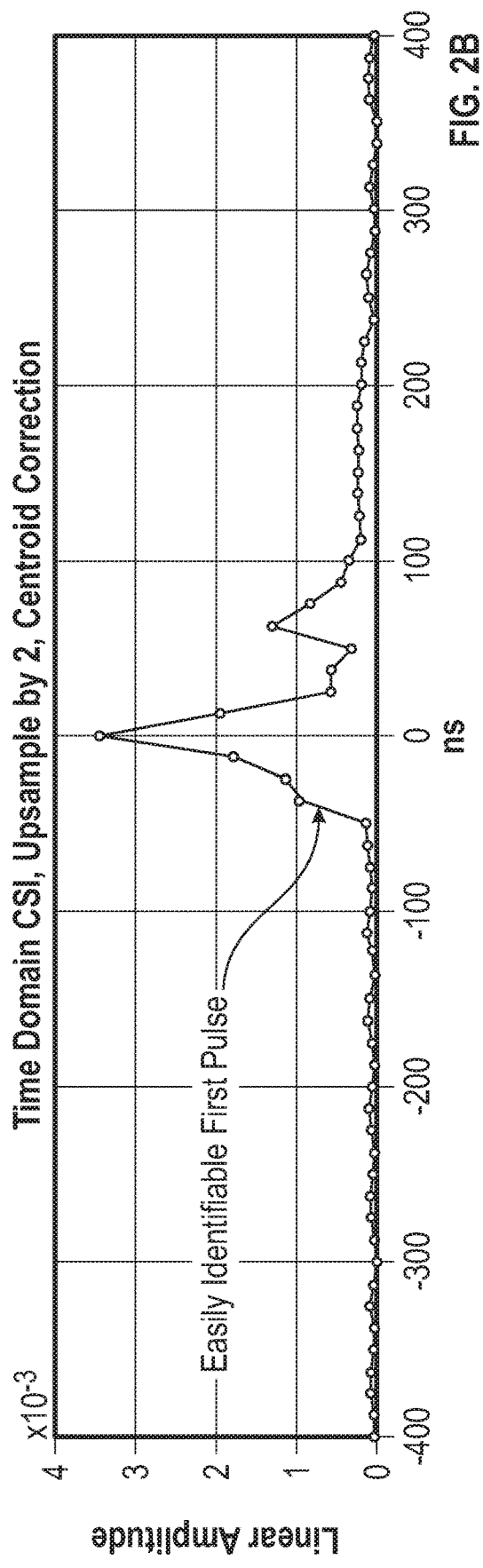
Figure 2C:
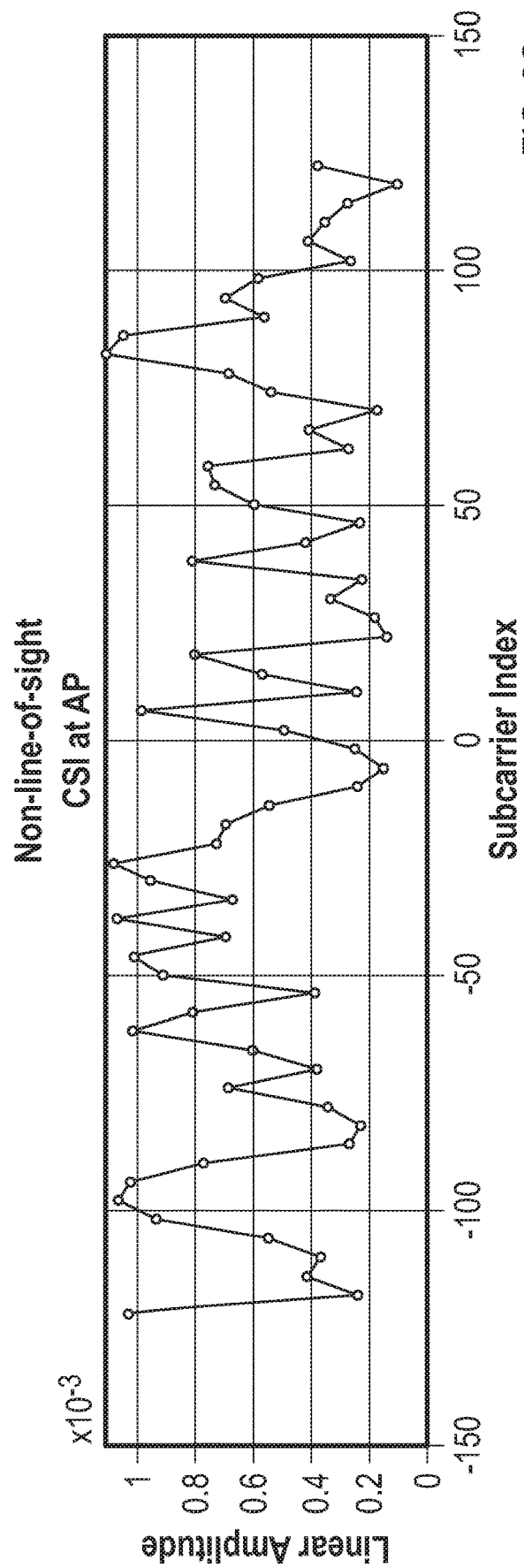
Figure 2D:
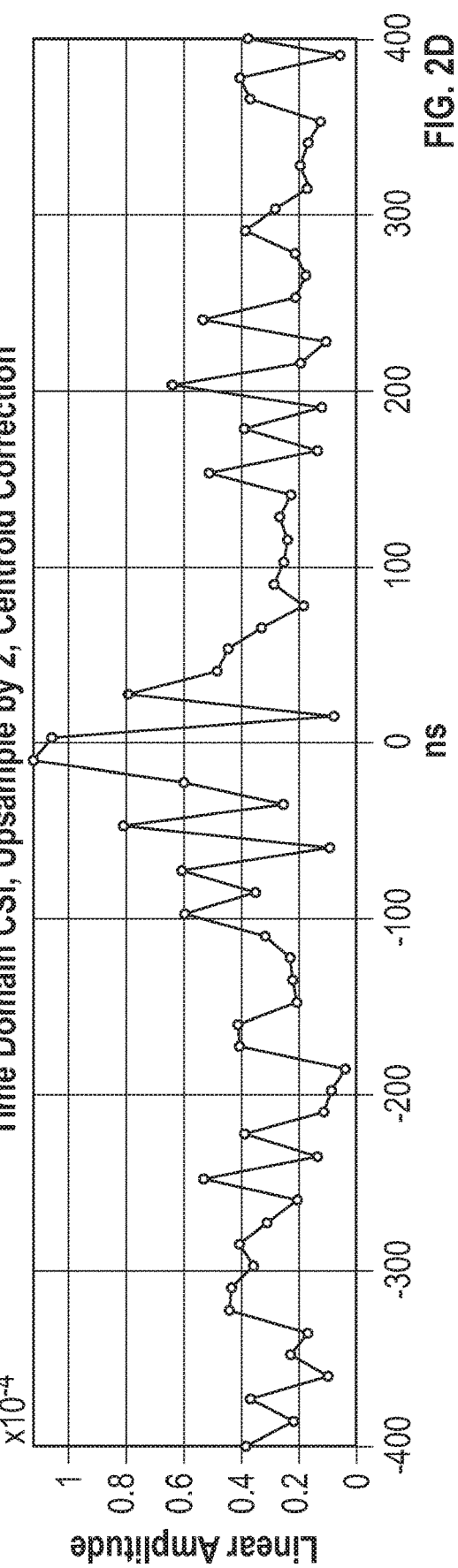

FIG. 2A, FIG. 2B, FIG. 2C, and FIG. 2D illustrate signal Channel State Information (CSI) in the frequency domain and in the time domain for LOS and NLOS environments. From FIG. 2A, FIG. 2B, FIG. 2C, and FIG. 2D, it may be observed that NLOS has a strong multipath. Actual measurements from AP pairs are illustrated in FIG. 2A, FIG. 2B, FIG. 2C, and FIG. 2D. FIG. 2A and FIG. 2C show signal CSI in the frequency domain, while FIG. 2B and FIG. 2D show signal CSI in the time domain. FIG. 2A and FIG. 2B correspond to the LOS environment while FIG. 2C and FIG. 2D correspond to the NLOS environment. As shown in FIG. 2A and FIG. 2B, LOS may have a clear initial pulse in the time domain, making it easy to pick out the true initial Time-of-Arrival (ToA) of the packet. As shown in FIG. 2C and FIG. 2D, NLOS has many reflections resulting in many pulses and it may be difficult to determine if a first detectible pulse is the LOS pulse or just another reflection.

Figure 3A:
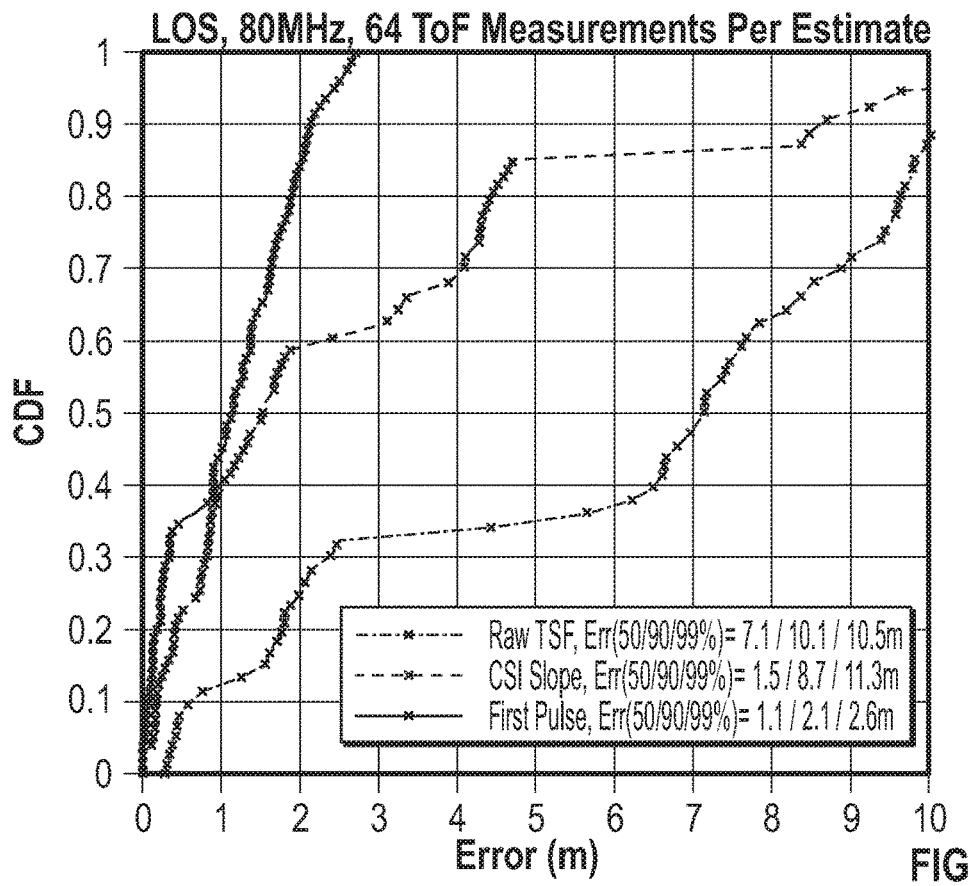
FIG. 3A and FIG. 3B illustrate a Cumulative Distribution Function (CDF) of error for LOS and NLOS environments.
Figure 3B:
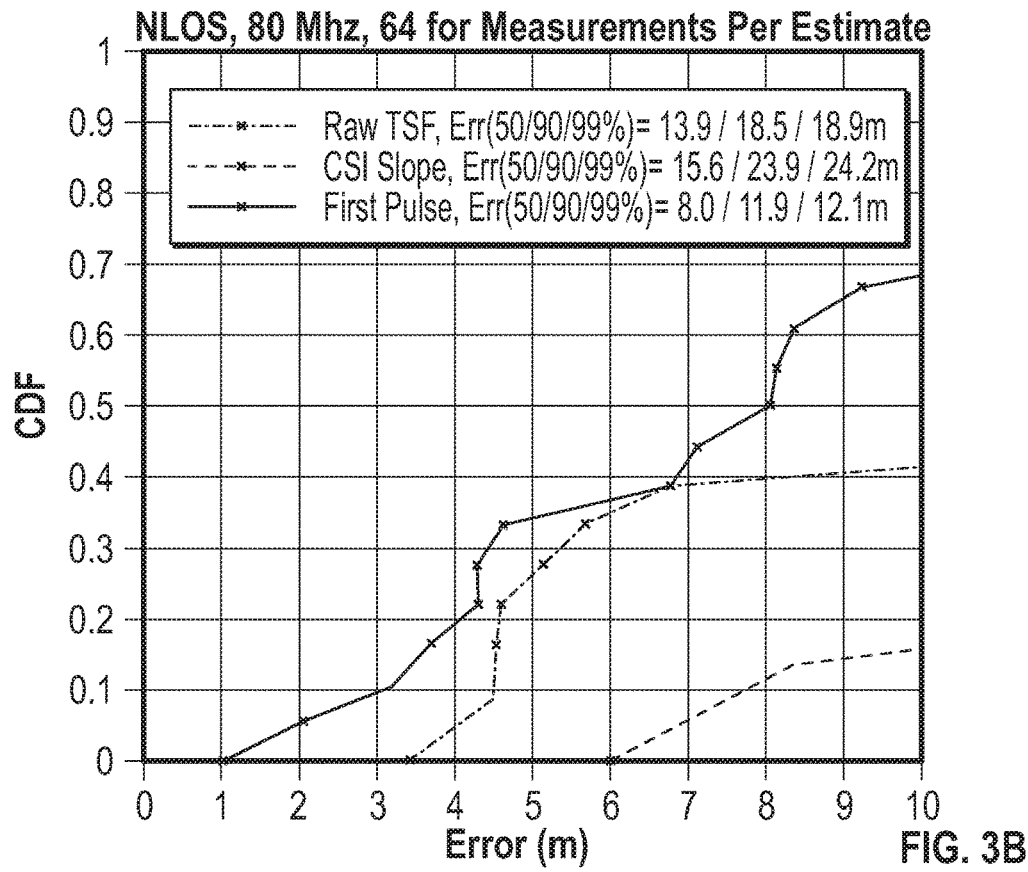

FIG. 3A and FIG. 3B illustrate a Cumulative Distribution Function (CDF) of error for LOS and NLOS. Three different processing methods are illustrated: i) using raw timestamps; ii) correcting raw timestamps with phase slope correction of CSI; and iii) correcting raw timestamps with phase slope correction of CSI and looking for a first pulse in an impulse response in the time domain. As can be seen in FIG. 3A and FIG. 3B, LOS AP pairs have a small error while NLOS AP pairs have a large error.

Figure 4:
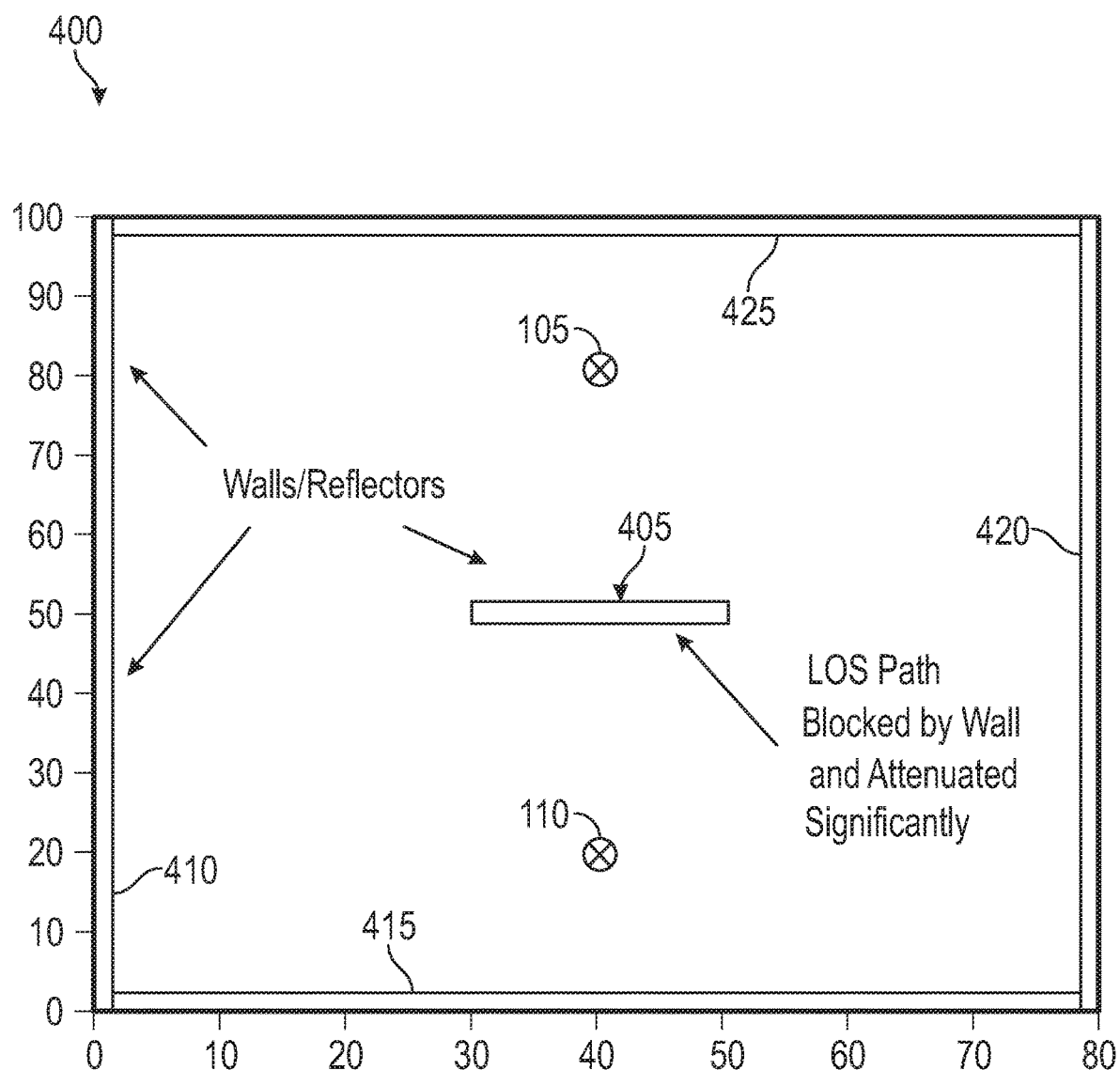
FIG. 4 is a block diagram of an operating environment.

FIG. 4 is a block diagram of an operating environment 400. As shown in FIG. 4, operating environment 400 may comprise first service end point 105 and second service end point 110. A first wall 405 may separate first service end point 105 and second service end point 110. First wall 405 may attenuate a LOS signal between first service end point 105 and second service end point 110. An enclosure comprising a second wall 410, a third wall 415, a fourth wall 420, and a fifth wall 425 may surround first service end point 105 and second service end point 110. Due to first wall 405, second wall 410, third wall 415, fourth wall 420, and fifth wall 425, a strong multipath NLOS environment may exist in operating environment 400 where transmitted packets may reflect off first wall 405, second wall 410, third wall 415, fourth wall 420, and fifth wall 425.

Figure 5:
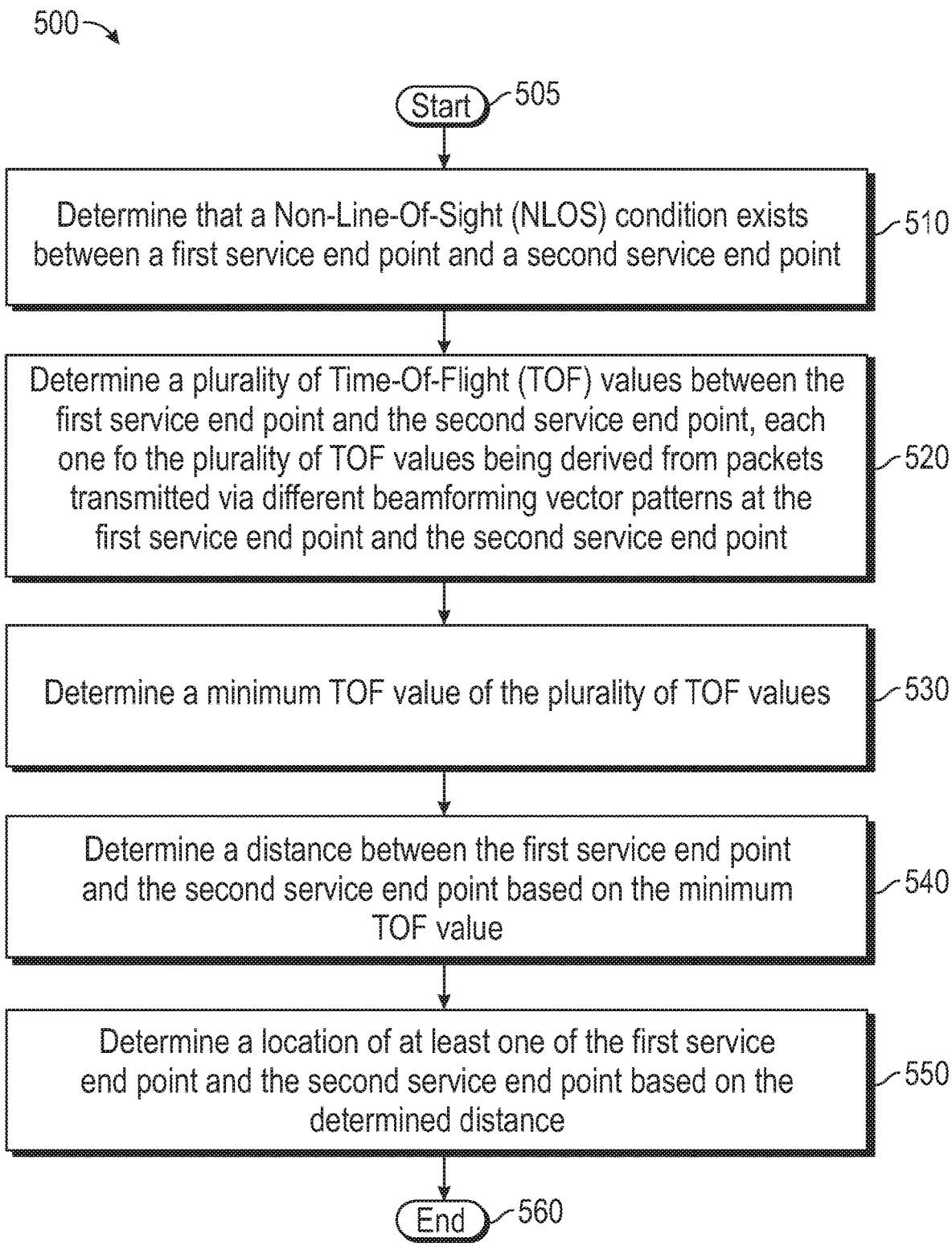
FIG. 5 is a flow chart of a method for providing AP placement using Fine Time Measurement (FTM)

FIG. 5 is a flow chart setting forth the general stages involved in a method 500 consistent with an embodiment of the disclosure for providing Access Point (AP) placement using Fine Time Measurement (FTM). Method 500 may be implemented using a computing device 700 as described in more detail below with respect to FIG. 7. Ways to implement the stages of method 500 will be described in greater detail below.

Consistent with embodiments of the disclosure, method 500 described below may provide accurate distances using ToF in the presence of a strong multipath NLOS environment. To obtain accurate data in the presence of a strong multipath NLOS environment, embodiments of the disclosure may use beamforming at first service end point 105 and second service end point 110.

Beamforming may comprise a process that performs adaptive spatial signal processing with an array of transmitters or receivers. Signals from the array may be combined in a manner that increases the signal strength to and from a particular desired direction while signals to and from other directions may be combined destructively. This results in degradation of the signal strength to and from the undesired direction, while increasing the signal strength in the desired direction.

Method 500 may begin at starting block 505 and proceed to stage 510 where computing device 700 may determine that a NLOS condition exists between first service end point 105 and second service end point 110 in operating environment 400. For example, multiple ToF exchanges may be performed with different but similar beamforming vector patterns. Then it may be determined that the NLOS condition exists when a variance of the results of the multiple ToF exchanges across those beamforming vector patterns is greater than a predetermined value. A low variance (e.g., <3 m) may indicate a LOS environment. However, a high variance (e.g., 10's of meters) may indicate a NLOS environment. Because operating environment 400 may comprise a strong multipath NLOS environment, this process may indicate a high variance when applied to operating environment 400.

Figure 6:
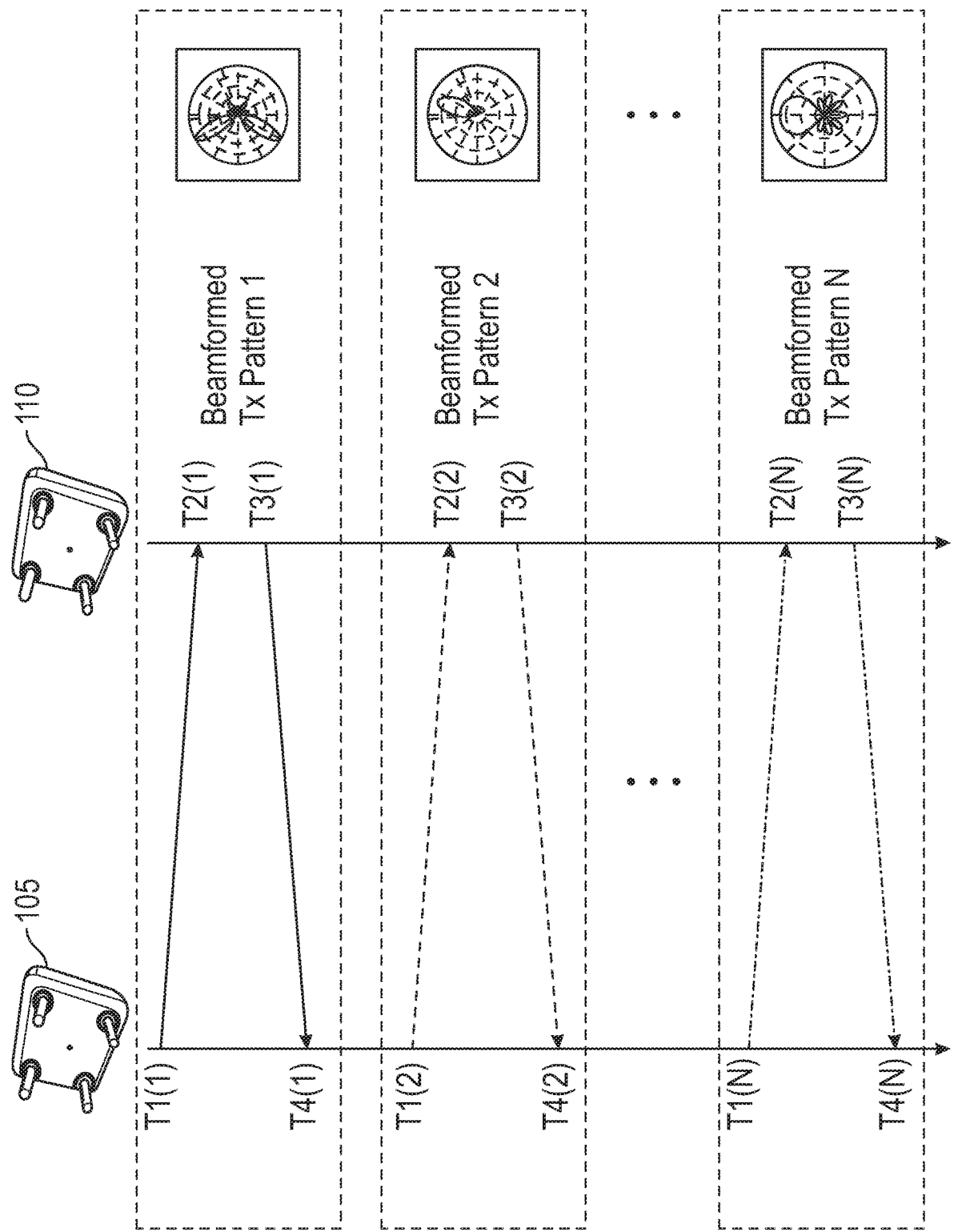
FIG. 6 illustrates AP-to-AP ToF ranging.

From stage 510, where computing device 700 determines that the NLOS condition exists between first service end point 105 and second service end point 110, method 500 may advance to stage 520 where computing device 700 may determine a plurality of TOF values between first service end point 105 and second service end point 110. Each one of the plurality of TOF values may be derived from packets transmitted via different beamforming vector patterns at first service end point 105 and second service end point 110. For example, as illustrated by FIG. 6, N packets exchanges may be used, with each one having a different transmitting beamforming vector pattern (i.e., transmit beamforming weights). These beamforming vector patterns may be randomly generated. N may range between 100 and 1,000 for example. In other words, many packets may be sent out from first service end point 105 and second service end point 110 and the signal beam pattern may be changed for each one. All these packets should share the same LOS, which means that the first copy of the signal should be similar for them. These packets may target different reflections in operating environment 400 as the beam pattern changes, causing the NLOS pulses to vary in contribution at the receiver. Each packet exchange may produce a different TOF value resulting from the different transmitting beamforming vector patterns.

Once computing device 700 determines the plurality of TOF values between first service end point 105 and second service end point 110 in stage 520, method 500 may continue to stage 530 where computing device 700 may determine a minimum TOF value of the plurality of TOF values. For example, the ToF value result may be selected that may be the minimum because the ToF direct path may be the shortest time between first service end point 105 and second service end point 110. In the example shown in FIG. 4, this minimum TOF value may result when first service end point 105 and second service end point 110 have transmitting beamforming vector patterns that are aimed at each other through first wall 405.

After computing device 700 determines the minimum TOF value of the plurality of TOF values in stage 530, method 500 may proceed to stage 540 where computing device 700 may determine a distance between first service end point 105 and second service end point 110 based on the minimum TOF value. For example, the minimum TOF value may be multiplied by the speed of light to obtain the distance between first service end point 105 and second service end point 110.

Once computing device 700 determines the distance between first service end point 105 and second service end point 110 based on the minimum TOF value in stage 540, method 500 may continue to stage 550 where computing device 700 may determine a location of at least one of first service end point 105 and second service end point 110 based on the determined distance. For example, first service end point 105 and second service end point 110 may be included with a plurality of service end points in a WLAN and the aforementioned ToF ranging with beamforming may be performed between all of the plurality of service end points. If the location of one service end point is known and if the distances between the service end points in the WLAN are known, a triangulation process may be used to determine the location of all the other service end points relative to the service end point with the known location. Once computing device 700 determines the location of at least one of first service end point 105 and second service end point 110 based on the determined distance in stage 550, method 500 may then end at stage 560.

Figure 7:
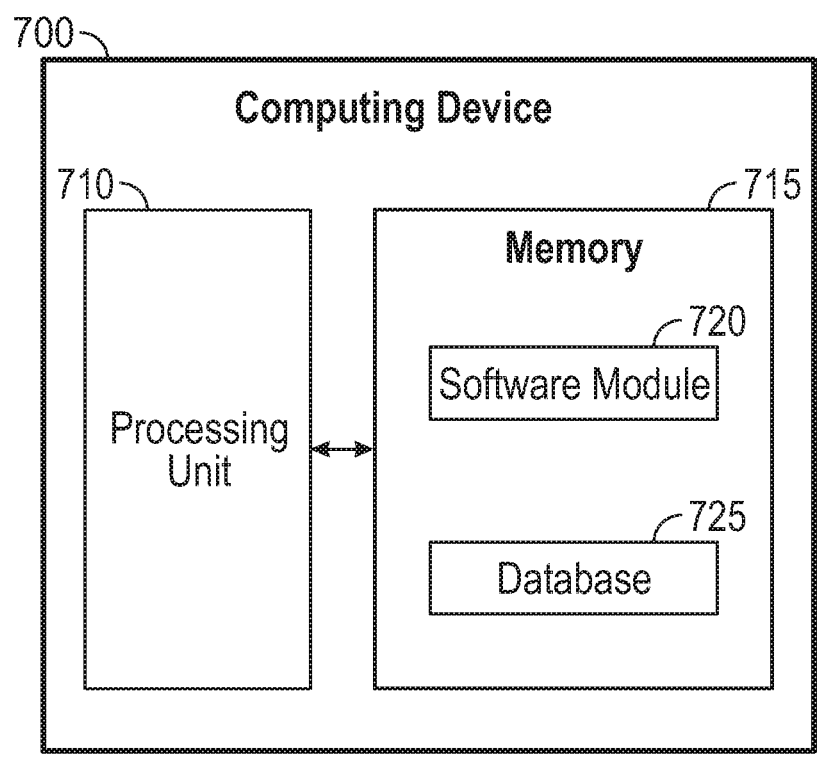
FIG. 7 is a block diagram of a computing device.

FIG. 7 shows computing device 700. As shown in FIG. 7, computing device 700 may include a processing unit 710 and a memory unit 715. Memory unit 715 may include a software module 720 and a database 725. While executing on processing unit 710, software module 720 may perform, for example, processes for providing Access Point (AP) placement using Fine Time Measurement (FTM) as described above with respect to FIG. 5. Computing device 700, for example, may provide an operating environment for first service end point 105 and second service end point 110. First service end point 105 and second service end point 110 may operate in other environments and are not limited to computing device 700.

Computing device 700 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    determining, by a computing device, a plurality of Time-of-Flight (ToF) values between a first service end point and a second service end point, wherein each one of the plurality of ToF values is derived from packets transmitted via different beamforming vector patterns at the first service end point and the second service end point, and wherein each of the packets transmitted between the first service end point and the second service end point have a different beamforming vector pattern of the different beamforming vector patterns;
    determining a minimum ToF value of the plurality of ToF values; and
    determining a distance between the first service end point and the second service end point based on the minimum ToF value.

2. The method of claim 1, further comprising determining a location of at least one of the first service end point and the second service end point based on the determined distance.

3. The method of claim 1, wherein determining the plurality of ToF values comprises determining the plurality of ToF values in response to determining that a Non-Line-of-Sight (NLOS) condition exists between the first service end point and the second service end point.

4. The method of claim 3, wherein determining that the NLOS condition exists comprises:
    performing multiple ToF exchanges with different but similar beamforming vector patterns; and
    determining that the NLOS condition exists when a variance of results of the multiple ToF exchanges is greater than a predetermined value.

5. The method of claim 4, wherein the predetermined value comprises 10 meters or greater.

6. The method of claim 1, wherein the different beamforming vector patterns are chosen at random.

7. The method of claim 1, wherein the first service end point comprises a first Access Point (AP) and the second service end point comprises a second AP.

8. A system comprising:
    a memory storage; and
    a processing unit coupled to the memory storage, wherein the processing unit is operative to:
        determine a plurality of Time-of-Flight (ToF) values between a first service end point and a second service end point, wherein each one of the plurality of ToF values is derived from packets transmitted via different beamforming vector patterns at the first service end point and the second service end point, and wherein each of the packets transmitted between the first service end point and the second service end point have a different beamforming vector pattern of the different beamforming vector patterns;
        determine a minimum ToF value of the plurality of ToF values; and determine a distance between the first service end point and the second service end point based on the minimum ToF value.

9. The system of claim 8, wherein the processing unit is further operative to determine a location of at least one of the first service end point and the second service end point based on the determined distance.

10. The system of claim 8, wherein the processing unit being operative to determine the plurality of ToF values comprises the processing unit being operative to determine the plurality of ToF values in response to determining that a Non-Line-of-Sight (NLOS) condition exists between the first service end point and the second service end point.

11. The system of claim 10, wherein the processing unit being operative to determine that the NLOS condition exists comprises the processing unit being operative to:
    perform multiple ToF exchanges with different but similar beamforming vector patterns; and
    determine that the NLOS condition exists when a variance of results of the multiple ToF exchanges is greater than a predetermined value.

12. The system of claim 11, wherein the predetermined value comprises 10 meters or greater.

13. The system of claim 11, wherein the different beamforming vector patterns are chosen at random.

14. The system of claim 8, wherein the first service end point comprises a first Access Point (AP) and the second service end point comprises a second AP.

15. A non-transitory computer-readable medium that stores a set of instructions which when executed perform a method comprising:
    determining, by a computing device, a plurality of Time-of-Flight (ToF) values between a first service end point and a second service end point, wherein each one of the plurality of ToF values is derived from packets transmitted via different beamforming vector patterns at the first service end point and the second service end point, and wherein each of the packets transmitted between the first service end point and the second service end point have a different beamforming vector pattern of the different beamforming vector patterns;
    determining a minimum ToF value of the plurality of ToF values; and
    determining a distance between the first service end point and the second service end point based on the minimum ToF value.

16. The non-transitory computer-readable medium of claim 15, further comprising determining a location of at least one of the first service end point and the second service end point based on the determined distance.

17. The non-transitory computer-readable medium of claim 15, wherein determining the plurality of ToF values comprises determining the plurality of ToF values in response to determining that a Non-Line-of-Sight (NLOS) condition exists between the first service end point and the second service end point.

18. The non-transitory computer-readable medium of claim 17, wherein determining that the NLOS condition exists comprises:
    performing multiple ToF exchanges with different but similar beamforming vector patterns; and
    determining that the NLOS condition exists when a variance of results of the multiple ToF exchanges is greater than a predetermined value.

19. The non-transitory computer-readable medium of claim 15, wherein the different beamforming vector patterns are chosen at random.

20. The non-transitory computer-readable medium of claim 15, wherein the first service end point comprises a first Access Point (AP) and the second service end point comprises a second AP.

* * * * *